(12) United States Patent
Jacinavicius et al.

(10) Patent No.: US 7,133,426 B2
(45) Date of Patent: Nov. 7, 2006

(54) METHOD AND APPARATUS FOR PRODUCING A PULSED LASER BEAM

(75) Inventors: Laimutis Jacinavicius, Vilnius-5 (LT); Saulius Jacinavicius, Vilnius-57 (LT); Andrejus Michailovas, Vilnius-51 (LT)

(73) Assignee: EKSPLA Ltd. (LT)

( * ) Notice: Subject to any disclaimer, the term of this patent is extended or adjusted under 35 U.S.C. 154(b) by 167 days.

(21) Appl. No.: 10/785,219

(22) Filed: Feb. 24, 2004

(65) Prior Publication Data
US 2005/0185682 A1    Aug. 25, 2005

(51) Int. Cl.
*H01S 3/098* (2006.01)

(52) U.S. Cl. .......................................... 372/18; 372/12

(58) Field of Classification Search .................. 372/12, 372/15, 16, 17, 18
See application file for complete search history.

(56) References Cited

U.S. PATENT DOCUMENTS

| | | | |
|---|---|---|---|
| 3,586,997 A | | 6/1971 | Kinsel |
| 3,879,686 A | * | 4/1975 | Milam et al. .................. 372/25 |
| 3,978,429 A | | 8/1976 | Ippen et al. |
| 4,019,156 A | | 4/1977 | Fountain et al. |
| 4,435,809 A | | 3/1984 | Tsang et al. |
| 4,665,524 A | | 5/1987 | Cotter |
| 5,014,277 A | | 5/1991 | Van Driel et al. |
| 5,449,645 A | | 9/1995 | Borrelli et al. |
| 6,035,079 A | * | 3/2000 | Fields et al. .................. 385/19 |
| 6,466,604 B1 | | 10/2002 | Kopf |
| 6,580,732 B1 | * | 6/2003 | Guch et al. .................. 372/18 |
| 6,917,631 B1 | * | 7/2005 | Richardson et al. ........... 372/5 |

OTHER PUBLICATIONS

K. Wundke, S. Potting, J. Auxier, A. Schulzgen, N. Peyghambarian and N.F. Borrelli, 'PbS quantum-dot-doped glasses for ultrashort-pulse generation, Appl. Phys. Lett. 76, 10-12 (2000).*
K. V. Yumashev, et al., "Nonlinear optical properties of solgel-derived glasses doped with copper selenide nanoparticles", J. Opt. Soc. Am. B, vol. 17, No. 4. 572-579 (Apr. 2000).
A.E. Siegman, *Lasers* (University Science Books, 1986), pp. 1041-1061.
J.A. Fleck, Jr., "Origin of short-pulse emission by passively switched lasers", J. Appl. Phys. 39, 3318-3327 (1968).

(Continued)

*Primary Examiner*—Minsun Oh Harvey
*Assistant Examiner*—Tuan N. Nguyen
(74) *Attorney, Agent, or Firm*—Altera Law Group, LLC

(57) ABSTRACT

A mode locked pulsed laser is constructed to shorten pulse duration by a solid state saturable absorber, such as a glass doped with a quantum-dot material such as PbS. The saturable absorber, used as a passive mode locker, is preferably used in combination with an active mode locker. Once the pulses are at about the saturation level of the absorber, a Q control module maintains the pulse energy at a roughly constant level while the pulse is shortened. When the pulses are sufficiently short, the mode lockers and Q control module are switched out of the cavity, and then the short pulses are amplified. When the pulses reach sufficient energy, the light is switched out of the cavity by a cavity dumper. The cavity dumper, switches, Q control module and active mode locker may use electro-optic crystals to rotate the polarization of the beam.

28 Claims, 2 Drawing Sheets

OTHER PUBLICATIONS

P. Heinz, M. Fickenscher and A. Laubereau, "Electro-optic gain control and cavity dumping of a Nd:Glass laser with active-passive mode-locking", Optics Comm. 62, 343-347 (1987).

K. Wundke, S. Pötting, J. Auxier, A. Schülzgen, N. Peyghambarian and N.F. Borrelli, "PbS quantum-dot-doped glasses for ultrashort-pulse generation", Appl. Phys. Lett. 76, 10-12 (2000).

G. Tamulaitis, V. Gulbinas, G. Kodis, A. Dementjev, L. Valkunas, I. Motchalov and H. Raaben, "Optical nonlinearities of glass doped with PbS nanocrystals", J. Appl. Phys. 88, 178-182 (2000).

A.M. Malyarevich, V.G. Savitski, P.V. Prokoshin, N.N. Posnov, K.V. Yumashev, E. Raaben and A.A. Zhilin, "Glass doped with PbS quantum dots as a saturable absorber for 1-μm neodymium lasers", J. Opt. Soc. Am. B 19, 28-32 (2002).

V.G. Savitski, N.N. Posnov, P.V. Prokoshin, A.M. Malyarevich, K.V. Yumashev, M.I. Demchuk, A.A. Lipovskii, "PbS-doped phosphate glasses saturable absorbers for 1.3-μm neodymium lasers", Appl. Phys. B 75, 841-846 (2002).

* cited by examiner

METHOD AND APPARATUS FOR PRODUCING A PULSED LASER BEAM

BACKGROUND OF THE INVENTION

1. Field of the Invention

The present invention is directed to pulsed lasers, and more particularly to pulsed lasers for producing high power mode locked light pulses.

2. Description of the Related Art

A laser, in its simplest configuration, operates in a "continuous wave" (cw) mode, in which the power output is relatively constant over time. For many applications, such as cutting, drilling, and investigation of media properties, it would be beneficial to use a pulsed laser, in which the power output is extremely high over a very short period of time. In such a pulsed laser, the output power is effectively "stored up" in the laser cavity over a period of time, then released in a short burst. During the duration of the laser pulse, known as the pulse width or pulse duration, the output power of the laser may be many orders of magnitude larger than the continuous wave output power. A preferable method of generating these short pulses is known as mode locking.

A physical description of mode locking may be found in A. E. Siegman, "Lasers" (University Science Books, 1986), pp. 1041–1061. The output from a mode locked laser is a typically a train of regularly spaced pulses of temporal separation T, where T equals the round-trip time for light inside the laser cavity, although the laser cavity may be modified to produce a single pulse with a manual trigger. Mode locked lasers can routinely produce pulses with durations of picoseconds.

There are essentially three categories of mode locking, known as "active", "passive" and "active-passive". Each of these is described in greater detail.

In active mode locking, a modulator is placed inside the laser cavity, such as an acousto-optic or electro-optic modulator. The modulation frequency should be well tuned to the round-trip frequency inside the cavity. The laser begins to oscillate in the form of a short pulse that circulates around inside the laser cavity, passing through the modulator on each round trip just at the instant when the modulator transmission is at its maximum. On each pass through the modulator, the pulse becomes shorter, because the leading and trailing edges of the pulse are attenuated more than the peak of the pulse. Because the modulation is controlled by an external device, the pulse emission from an active mode locked laser is inherently stable (i.e., the pulse energy is fairly constant from pulse to pulse, and the pulse emission is regular and predictable over time) and is, therefore, easily synchronized with other equipment. One drawback to active mode locking is that the pulse durations are relatively long, on the order of tens of picoseconds.

Various prior art active mode locking techniques are disclosed in U.S. Pat. No. 3,586,997, issued to Kinsel, U.S. Pat. No. 4,665,524, issued to Cotter, and U.S. Pat. No. 5,014,277, issued to Van Driel et al.

In passive mode locking, an optically nonlinear material is placed inside the laser cavity. The nonlinear material is generally absorbing at low optical intensities, but then saturates and becomes more transparent (less absorbing) at high intensities. Because of this behavior, the nonlinear material is usually referred to as a saturable absorber. An optical pulse, which usually begins its life as a statistically indeterminate noise spike, grows in intensity as it travels through the laser cavity, due to pumping of the gain medium. Once the peak intensity of the noise spike reaches the saturation level of the nonlinear material, the peak of the noise spike receives less attenuation than the leading and trailing edges, and the duration of the noise spike decreases upon each subsequent pass through the nonlinear material, until it reaches a suitably short length and becomes the output pulse. Two primary advantages of passive mode locking over active mode locking are: (1) Passive is simpler to implement, because it doesn't require an external modulator exactly tuned to the cavity round-trip time, and (2) the pulses produced by passive mode locking are significantly shorter than for active mode locking. Two disadvantages of passive mode locking are: (1) The pulse output is less stable than for active mode locking (i.e., the power varies from pulse to pulse, and the time between pulses varies statistically), and (2) a passive mode locked laser cannot be synchronized with other equipment.

Various prior art passive mode locking techniques are disclosed in U.S. Pat. No. 3,978,429, issued to Ippen et al., and U.S. Pat. No. 4,435,809, issued to Tsang et al.

In active-passive mode locking, both active and passive mode locking methods are employed simultaneously. A laser cavity may contain both a modulator and a saturable absorber. Combining both active and passive techniques in the same laser provides the advantages of both short pulse duration and pulse stability (i.e., the pulse energy is fairly constant from pulse to pulse, and the pulse emission is regular and predictable over time). In addition, active-passive mode locked lasers are also easily synchronized with other equipment.

A prior art active-passive mode locking technique is disclosed in U.S. Pat. No. 4,019,156, issued to Fountain et al.

The most common saturable absorber material used by passive (or active-passive) mode locked lasers is a liquid dye, which is continuously recirculated in a flat stream that crosses the beam inside the laser cavity. The dyes perform well optically, with desirable characteristics such as good absorption saturation contrast and fast recovery times. Unfortunately, they break down chemically after a certain amount of use, and must be replaced periodically, often at inconvenience and expense to the user. The dyes are often toxic, requiring careful handling by the user, or a service call to a maintenance technician. Because of the dye's inherent chemical instability, and the inconvenience of periodic replacement of the dye, a great deal of effort has been spent on finding solid-state saturable absorbers to replace dyes in mode locked lasers.

A semiconductor material can be used as a saturable absorber, as disclosed in U.S. Pat. No. 6,466,604, issued to Kopf. In this prior art, the semiconductor material is grown as a thin film structure on an optical component, and proves very convenient to use. However, the semiconductor material shows poor optical qualities, specifically a low contrast ratio and a low damage threshold. Additionally, the material suffers damage when used in high power lasers.

Recently, a new category of material has appeared, in which tiny semiconductor crystals, sometimes referred to as microcrystals, are grown in an amorphous glass matrix. The microcrystals are so small that they show quantum confinement effects in three dimensions, and are given the name quantum dots. Quantum dots are extremely useful in the fabrication of nonlinear optical devices, and an example of PbS used as a quantum dot material is disclosed in U.S. Pat. No. 5,449,645, issued to Borrelli et al.

Quantum dots have been used as saturable absorbers for a variety of quantum dot materials at a variety of wavelengths. See, for instance, V. G. Savitski, et al "PbS-doped phosphate glasses saturable absorbers for 1.3-μm neodymium lasers", Applied Physics B, vol. 75, No. 8, pp. 841–846, 2002; K. Wundke et al "PbS quantum-dot-doped glasses for ultrashort-pulse generation", Applied Physics Letters, vol. 76, No. 1, pp. 10–12, 2000; A. M. Malyarevich et al, "Nonlinear optical properties of solgel-derived glasses doped with copper selenide nanoparticles", J. Opt. Soc. Am. B, vol. 17, No. 4, pp. 572–578, 2000; G. Tamulaitis et al, "Optical nonlinearities of glass doped with PbS nanocrystals", J. Applied Physics, Vol. 88, No. 1, pp. 178–182, 2000.

One drawback to quantum-dot doped glass saturable absorbers is that they tend to have relatively poor thermal properties. For relatively low powers, they perform adequately. But when used for high power pulse generation, the repetition rate is typically kept low, in order to prevent thermal damage to the saturable absorber.

There is a need for a mode locked laser that does not suffer the disadvantages of conventional mode locked lasers having a dye solution as the saturable absorber, while nonetheless being capable of high output power, short pulse duration, and fast repetition rate.

BRIEF SUMMARY OF THE INVENTION

These and other disadvantages are overcome by the present invention, one embodiment of which is a pulsed laser comprising a first beam path for establishing at least one short light pulse; a second beam path for amplifying the short light pulse to obtain at least one high power short light pulse; a switch for directing the short light pulse from the first beam path into the second beam path; and a pulse shortening element disposed in the first beam path and absent from the second beam path.

A further embodiment of the present invention is an active-passive mode locked laser comprising a first high reflectivity mirror; a second high reflectivity mirror, a first beam path being defined between the first high reflectivity mirror and the second high reflectivity mirror; a loss module disposed in the first beam path; an active mode locker disposed in the first beam path; a passive mode locker disposed in the first beam path; a third high reflectivity mirror, a second beam path being defined between the first high reflectivity mirror and the third high reflectivity mirror and having a common beam path segment in common with the first beam path; a cavity dumper disposed in the common beam path segment and having an output beam path; a gain module disposed in the common beam path segment; and a switch disposed in the common beam path segment at a first end thereof, a second end of the common beam path segment being at the first mirror.

A further embodiment of the present invention is a method for producing a high power pulsed laser beam comprising establishing at least one light pulse in a first beam path; shortening the light pulse in the first beam path to obtain at least one short light pulse, the first beam path comprising a passive pulse shortening element; directing the short light pulse into a second beam path, the passive pulse shortening element being absent from the second beam path; and amplifying the short light pulse in the second beam path to obtain at least one high power short light pulse.

DETAILED DESCRIPTION OF THE INVENTION, INCLUDING THE BEST MODE

A mode locked laser may be provided with a quantum dot-doped glass material as the saturable absorber to achieve pulses of short duration and high power comparable with that of lasers having a dye solution as the saturable absorber. In one embodiment, a laser pulse is first shortened in a cavity that contains a solid saturable absorber, preferably a quantum dot-doped glass material, and then amplified in a cavity that does not contain the solid saturable absorber. This configuration avoids potential optical and thermal damage to the solid saturable absorber that might be caused by transmission of large-amplitude pulses. Therefore, higher optical powers and repetition rates may be obtained from the laser, while still using a solid saturable absorber for longevity, convenience and cost savings.

Figure 1:
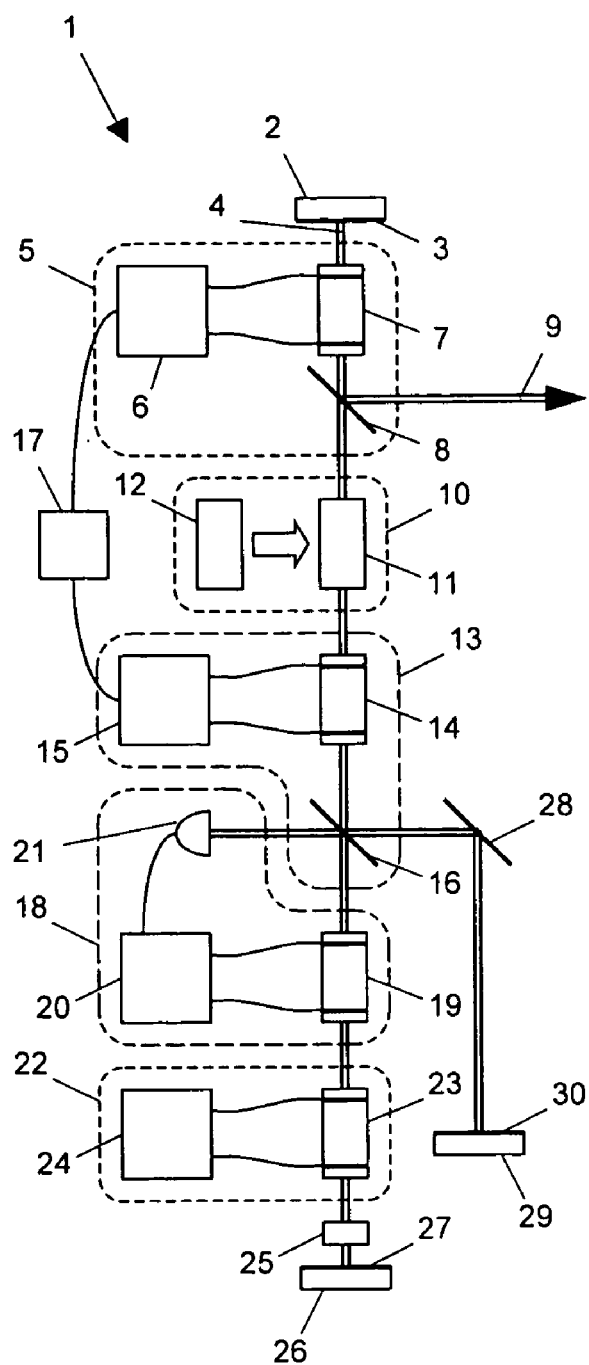
FIG. 1 is a schematic representation of an active-passive mode locked laser that uses a quantum dot-doped glass saturable absorber.

FIG. 1 shows a mode locked laser 1 that uses active-passive mode locking and a saturable absorber, and produces high-power, short-duration pulses.

At one end of the laser 1 is a mirror 2. The mirror 2 affects the shape of the resonant mode and the stability of the laser 1 and is be preferably concave in shape, although it may also be convex or planar. A high-reflectance thin film stack 3 is deposited on the mirror 2, and may contain wavelength-sensitive reflectance properties, in order to optimize the laser performance. Alternately, a metallic thin film stack may be used on the mirror 2, or a high-reflectance bulk material may be used for the mirror 2.

A laser beam 4 is preferably normally incident on the mirror 2, meaning that the reflected path is roughly coincident with the incident path. Alternately, the laser beam 4 may strike the mirror 2 at non-normal incidence, depending on the specific configuration of the laser cavity. In the preferred embodiment, the laser beam 4 is rotationally symmetric about its axis of propagation, and propagates through the center of all of the further optical components in the laser cavity.

The beam passes through a cavity dumper 5, which, when triggered, drains the laser cavity of its energy and produces an output beam 9, which may be a pulse or series of pulses. The cavity dumper 5 contains an electro-optic crystal 7 that rotates the plane of polarization of the laser beam 4 in response to a voltage applied by a controller 6. When a single output pulse is desired, the electro-optic crystal 7 rotates the polarization by approximately 90 degrees, and nearly all of the light is reflected out of the laser cavity by a polarizer 8. When a series of pulses is desired, the polarization is rotated by less than 90 degrees, and only a fraction of the light is emitted on each pass through the cavity dumper. The light reflected from the polarizer 8 forms the output beam 9. The timing of the controller 6 in the cavity dumper 5 may be precisely controlled by a timing unit 17, which ensures that the controller 6 is synchronized with the passage of a particular pulse in the laser cavity.

The polarizer 8 may be a thin-film polarizer which reflects one polarization component, say s-polarized light, and transmits the other, say p-polarized light. The output beam 9 is polarized with an orientation corresponding to the polarization of the reflected component, say s-polarization. Alternately, the polarizer 8 may be a polarization-sensitive crystal, such as a Glan-Thompson prism. While any of various polarizer types may be used, one should ensure that the chosen polarizer is not damaged by the high optical power inside the laser cavity. Note that although the incident angle on the polarizer 8 is drawn as 45 degrees in FIG. 1, it may be any convenient angle that is large enough to achieve separation of the p- and s-polarizations, and produces a conveniently-located output beam.

The laser beam 4 passes through a gain module 10, which amplifies the beam each time it passes through a gain medium 11. A pump 12 supplies power to the gain medium 11, and may be a flash lamp, a laser diode, a series of laser diodes, or another pulsed laser, for example. Various suitable types of laser pumps and gain media are both per se well-known in the art.

Note that the locations of the cavity dumper 5 and the gain module 10 may optionally be reversed, with the gain module 10 located between the cavity dumper 5 and the mirror 2.

The laser beam passes through a switch 13, which may preferably be similar in construction to the cavity dumper 5. A controller 15 applies a voltage to an electro-optic crystal 14, which rotates the plane of polarization in response to the voltage. A polarizer 16 transmits one polarization component, say p-polarized light, and reflects the other polarization component, say s-polarized light. The controller 15 may be precisely triggered by the timing unit 17, which may preferably also precisely trigger the controller 6 in the cavity dumper. In general, the switch 13 is operated to either transmit all the light, or reflect all the light; unlike the cavity dumper 5, there is generally little use for just a fraction of the light to be reflected or transmitted. Alternatively, the switch 13 may be any suitable type of optical switch, including an actuatable rotating or translating mirror.

Light that is transmitted through the switch 13, typically p-polarized, enters a loss module 18. Like the cavity dumper 5 and the switch 13, the loss module 18 also contains an electro-optic crystal 19 that rotates the plane of polarization in response to a voltage generated by a controller 20. The loss module 18 preferably uses the same polarizer 16 as the switch 13, as shown in FIG. 1, but may contain its own polarizer. Light reflected from the polarizer 16 is collected by a detector 21, preferably a photodetector that sends an electrical signal to controller 20 in response to the detected optical power. The function of the loss module 18 is to control the energy of the pulses that are produced. If the energy is too high, the controller 20 changes the voltage sent to the electro-optic crystal 19, so that more light is reflected (and therefore, less transmitted) from the polarizer 16. Likewise, if the pulse energy is too low, the voltage is changed so that less light is reflected from the polarizer 16. The electrical signal received by the controller 20 is essentially an error signal that drives a control system in the loss module 18, which ensures that the energy contained in each pulse is set roughly to its desired value. Note that the loss in the laser cavity is sometimes referred to as "Q", and that because the loss module 18 may adjust the value of Q, loss module 18 may be referred to as a "Q control module".

Light that passes from the switch 13 through the loss module 18 enters the active mode locker 22. The active mode locker 22 may preferably contain an electro-optic crystal 23 and a controller 24, just like the cavity dumper 5, the switch 13 and the loss module 18. However, the controller 24 in the active mode locker 22 supplies a periodic (AC) voltage to the crystal, in contrast to the largely DC voltages supplied by the other controllers 6, 15 and 20. The frequency of the controller 24 should be carefully tuned to correspond with the round-trip time of the laser cavity. For example, if a laser cavity is 1.5 m in optical path length, the round-trip time is $2 \times (1.5 \text{ m})/(3 \times 10^8 \text{ m/s})$, or 10 nanoseconds, and the corresponding frequency for the controller 24 is 100 MHz. The active mode locker therefore supplies a periodic loss to the cavity, and as a result, a pulse that develops in the cavity is synchronized to the controller 24. The peak of the pulses passes through the electro-optic crystal 23 at exactly the time of minimum loss.

The active mode locker 22 also uses the polarizer 16 from the switch, as does the loss module 18. Although the AC voltage applied to the electro-optic crystal produces a periodic intensity variation at the detector 21, the bandwidth of the detector 21 is preferably chosen to be less than the frequency of the controller 24, so that the AC variations merely average out to a DC offset. Optionally, the active mode locker 22 may include its own polarizer.

The light then passes through a passive mode locker, preferably a saturable absorber 25, which may preferably be a semiconductor quantum dot-doped glass. While the saturable absorber may be a liquid dye, a solid semiconductor quantum dot-doped glass is preferred because it is less difficult to handle and does not need periodic replacement.

The beam then strikes a mirror 26 at near-normal incidence. The mirror 26 is typically similar in composition to mirror 2, and may also preferably have a high-reflectance thin film stack 27. The mirror 26 affects the shape of the resonant mode and the stability of the laser 1, and is preferably concave in shape, although it may also be convex or planar. The value of the curvature may be either the same as or different from the curvature of the mirror 2.

Although the saturable absorber 25 is typically located adjacent to the mirror 26 in the laser cavity, the locations of the loss module 18 and the active mode locker 22 may be reversed.

The region between the mirror 2 and the mirror 26 may be known as the "resonator cavity", and the train of components between the switch polarizer 16 and the mirror 26 may be known as the "resonator arm". The reasons for these terms are explained more fully below.

Light passing through the switch 13 and reflected off the polarizer 16 is largely polarized, say with s-polarization. The light reflects off a subsequent polarizer 28 with the same orientation as the switch polarizer 16. The subsequent polarizer 28 acts as a clean-up polarizer, and may be similar in composition to either or both of the polarizers 8, 16. The light then strikes a mirror 29 at near-normal incidence, preferably with a high-reflectance thin film stack 30. The mirror may be similar in composition to either or both of the mirrors 2, 26.

The train of components between the switch polarizer 16 and the mirror 29 may be known as the "gain arm". Similarly, the region between the mirror 2 and the switch polarizer 16, in combination with the "gain arm", may be known as the "gain cavity".

Note that gain arm and the resonator arm may have equal path lengths or different path lengths. Note also that the gain cavity and the resonator cavity may have similar or different transverse mode profiles. The curvatures of the mirrors 26 and 29 may be the same or may be different.

There are alternate embodiments in which some of the component groups may be rearranged. For example, the cavity dumper 5 may be located in the gain arm between the switch 13 and the mirror 29. Likewise, the loss module 18 or the active mode locker 22 may be located between the mirror 2 and the switch 13.

The description thus far has focused largely on the components of the laser 1 and their individual functions. The remainder of the description details how to use the components together to produce a high-power, short-duration pulse or series of pulses.

Figure 2:
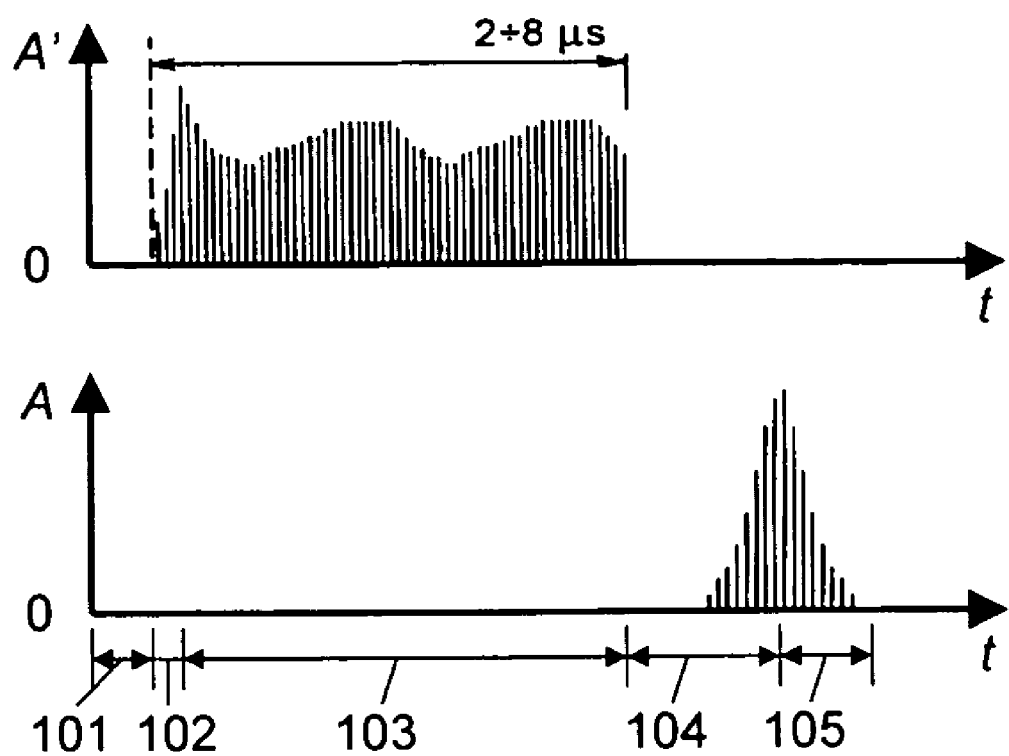
FIG. 2 is a graph of pulse energy versus time, for a resonator cavity (top plot) and a gain cavity (bottom plot).

FIG. 2 shows plots of pulse energies (y-axis) versus time (x-axis). The top plot shows the pulse energies in the resonator cavity (between mirrors 2 and 26), and the bottom plot shows the pulse energies in the gain cavity (between mirrors 2 and 29). The scale along the x-axis is the same for both plots. The scales along the y-axis are different, though, and comparable-sized peaks on the plots are in reality about 1000 times larger for the bottom plot. The time axis is broken up into four regions, 101–104, and each of these is treated in detail below.

In region 101, the pump 12 is on, the active mode locker controller 24 is on and oscillating at the round-trip frequency of the resonator cavity, the cavity dumper 5 is set to "not dump" (meaning that there is no output beam 9, and that the energy is retained in the laser cavity), the loss module 18 is set to "low loss" (a condition between "no loss" and "full loss", which correspond to polarization rotations of 0 degrees and 90 degrees, respectively), and the switch 13 is set to the resonator arm.

In region 101, the light in the resonator cavity is amplified on each pass through the gain module 10, and then attenuated on each pass through the loss module 18, so that the gain is larger than the loss in region 101. Any pulses that are present in the resonator cavity are very broad (i.e., long in duration), and the peaks of the pulses are below the saturation level of the saturable absorber 25. On each pass through the resonator cavity, the pulse energy increases, and the pulse duration does not change appreciably (still quite broad). The pulse peak reaches the saturation level of the saturable absorber 25 at the end of region 101.

In region 102 (the leftmost side of the plot), the equipment remains at the same settings as in region 101, and the pulse peak is above the saturation level of the saturable absorber 25. For the first few pulses, the loss module is still set to "low loss", the gain is larger than the loss, and the pulse amplitude grows with each pass through the resonator cavity. The pulse duration does not change appreciably in region 102 (still quite broad). At the end of region 102, the pulse energy reaches a predetermined value, as measured by the detector 21, and the control system in the loss module 18 automatically increases the loss to a value of "high loss" (a value between "low loss" and "full loss", where "high" loss is roughly equal to the gain of the gain module 10).

In region 103, the loss module is set to "high loss", and the rest of the equipment is unchanged from region 102. The peak of the pulse is above the saturation level, and the primary physical effect in region 103 is that the pulse becomes shorter. Note that the "high loss" level should be chosen carefully during calibration procedures, so that the peak level remains roughly constant from pass-to-pass, while the pulse duration decreases.

A saturable absorber becomes more transparent (less absorbing) as the intensity increases, so as long as the peak of the pulse is above the saturation level, and the tails of the pulse are below the saturation level, the pulse duration will decrease. Physically, the tails of the pulse are attenuated more than the peak on every pass through the saturable absorber 25, and over the course of many passes, which may number several hundred, the pulse duration reaches a minimum dictated by the physical properties of the saturable absorber 25. The pulses reach their minimum width by the end of region 103, and the end of this region is determined empirically during calibration routines. If the laser were to continue to operate further under the conditions of region 103, the pulses would all be roughly the same in width and amplitude.

The vertical lines in the plots of FIG. 2 represent individual pulses, and the separation between adjacent lines is the round-trip time of the resonator cavity. Note that the pulses are also synchronized with the active mode locker 22, so that the laser output may be synchronized with other equipment.

Note also that in the embodiment of FIG. 2, the envelope of the pulse energies varies over time, tracing out about two and a half periods over region 103. Illustratively, this behavior is caused by an imperfect power control servo in the loss module 18, and does not affect the output of the laser in any way.

To mark the end of region 103 and the beginning of region 104, the switch 13 is set to the gain arm. On each pass through the gain cavity in region 104, the pulses are amplified by the gain module 10, and the pulse duration remains at its short value. As seen in the plot of FIG. 2, the pulse energy is too small to register on the scale at the beginning of region 104, and increases dramatically until the end of region 104.

To mark the end of region 104 and the beginning of region 105, the cavity dumper 5 is set to "dump". If the electro-optic crystal 7 rotates the polarization by 90 degrees, all the light is drained from the gain cavity on one pass, and the output beam 9 consists of one pulse. This is called a "full dump". A "partial dump" uses a rotation of less than 90 degrees, and drains the gain cavity energy in a series of pulses, as depicted in FIG. 2.

Note that the pulses in regions 104 and 105 are spaced farther apart than in region 103—this is a result of a longer path length in the gain arm than in the resonator arm. This is merely an example. As stated earlier, the resonator cavity and gain cavity may have different modes and different optical path lengths.

Note that the vertical scales differ by a factor of about 1000 between the top (resonator) plot and the bottom (gain) plot. For instance, in the top plot, the peak pulse energy may be roughly 1 microjoule. In the bottom plot, the peak pulse energy may be roughly 1 millijoule.

To further clarify the meaning of the plots of FIG. 2, the top plots are for the resonator cavity, and the discrete vertical lines represent the pulse energies seen by a fictitious detector located at the mirror 26. The bottom plots are for the gain cavity, and represent the pulse energies seen by a fictitious detector located at the mirror 29. A sample time scale is shown on FIG. 2, and the combined durations of regions 102 and 103 may be generally in the range of about 2 to 8 microseconds.

The pulses are shortened in the resonator cavity (in region 103) and later amplified (in region 104) in the gain cavity. This two-cavity configuration additionally addresses a thermal issue. Because glass generally has poor thermal conductivity, it is generally difficult to adequately dissipate the heat that is generated when high power pulses pass through a glass saturable absorber. If a glass saturable absorber is used in a single-cavity high power laser, in which the pulses are amplified to a high energy while still passing through the glass saturable absorber, the pulse repetition rate must be decreased in order to avoid potential structural damage to the saturable absorber. By using a separate gain cavity, separate from the resonator cavity and not containing the glass saturable absorber, pulses may be amplified to their maximum energy and the pulse repetition rate may be increased without concern for damaging the saturable absorber.

Furthermore, the two-cavity configuration may address an optical issue that arises when certain glass saturable absorbers are subject to high intensities, comparable to those in typical high power lasers. At a certain power level, significantly above the level at which the absorber becomes transparent, it is found that the absorber may begin absorbing again. This would impose an upper limit on the pulse energy, if the saturable absorber were used in a single-cavity laser. By using separate gain and resonator cavities, the glass saturable absorber is not subjected to these high power levels, and is therefore not subject to a high power condition where it may begin absorbing again.

The description of the invention and its applications as set forth herein is illustrative and is not intended to limit the scope of the invention. Variations and modifications of the embodiments disclosed herein are possible, and practical alternatives to and equivalents of the various elements of the embodiments are known to those of ordinary skill in the art. These and other variations and modifications of the embodiments disclosed herein may be made without departing from the scope and spirit of the invention, as set forth in the claims.

The invention claimed is:

1. A pulsed laser, comprising:
   a first mirror;
   a second mirror;
   a first beam path being defined between the first mirror and the second mirror for establishing at least one short light pulse;
   a third mirror;
   a second beam path being defined between the first mirror and the third mirror for amplifying the short light pulse to obtain at least one high power short light pulse;
   a switch for directing the short light pulse from the first beam path into the second beam path; and
   a passive pulse shortening element disposed in the first beam path and absent from the second beam path;
   wherein the first beam path and the second beam path have a segment in common defined between the first mirror and the switch; and
   wherein the first beam path and the second beam path have respective separate segments, the passive pulse shortening element being disposed in the separate segment of the first beam path.

2. The pulsed laser of claim 1 wherein the passive pulse shortening element comprises a saturable absorber.

3. The pulsed laser of claim 2 wherein the saturable absorber is a solid state saturable absorber.

4. The pulsed laser of claim 3 wherein the solid state saturable absorber comprises a quantum dot-doped glass material.

5. The pulsed laser of claim 2 wherein the saturable absorber is a liquid saturable absorber.

6. The pulsed laser of claim 1 further comprising a variable switch disposed in the second beam path for outputting the high power short light pulse.

7. The pulsed laser of claim 1:
   further comprising a variable switch disposed in the common segment for outputting the high power short light pulse;
   wherein the first mirror is a high reflectivity mirror,
   wherein the second mirror is a high reflectivity mirror; and
   wherein the third mirror is a high reflectivity mirror.

8. The pulsed laser of claim 7 further comprising a gain module disposed in the common segment.

9. The pulsed laser of claim 8 further comprising:
   a loss module disposed in the separate segment of the first beam path; and
   an active pulse shortening element disposed in the separate segment of the first beam path.

10. The pulsed laser of claim 1;
    further comprising a variable switch disposed in the separate segment of the second beam path for outputting the high power short light pulse;
    wherein the first mirror is a high reflectivity mirror;
    wherein the second mirror is a high reflectivity mirror; and
    wherein the third mirror is a high reflectivity mirror.

11. A pulsed laser, comprising:
    a first beam path for establishing at least one short light pulse;
    a second beam path for amplifying the short light pulse to obtain at least one high power short light pulse;
    a switch for directing the short light pulse from the first beam path into the second beam path; and
    a passive pulse shortening element disposed in the first beam path and absent from the second beam path;
    wherein the first beam path and the second beam path have at least one segment in common; and
    wherein the first beam path and the second beam path have respective separate segments, the passive pulse shortening element being disposed in the separate segment of the first beam path.

12. The pulsed laser of claim 11 further comprising a variable switch disposed in the common segment for outputting the high power short light pulse.

13. The pulsed laser of claim 11 further comprising a variable switch disposed in the separate segment of the second beam path for outputting the high power short light pulse.

14. The pulsed laser of claim 11 further comprising:
    a gain module disposed in the common segment;
    a cavity dumper disposed in the common segment and having an output beam path;
    a loss module disposed in the separate segment of the first beam path; and
    an active mode locker disposed in the separate segment of the first beam path;
    wherein the passive pulse shortening element comprises a saturable absorber disposed in the separate segment of the first beam path.

15. The pulsed laser of claim 11 wherein the passive pulse shortening element comprises a saturable absorber.

16. The pulsed laser of claim 15 wherein the saturable absorber is a solid state saturable absorber.

17. The pulsed laser of claim 16 wherein the solid state saturable absorber comprises a quantum dot-doped glass material.

18. The pulsed laser of claim 15 wherein the saturable absorber is a liquid saturable absorber.

19. The pulsed laser of claim 11 further comprising a variable switch disposed in the second beam path for outputting the high power short light pulse.

20. A pulsed laser, comprising:
    a resonator cavity having a resonator arm;
    a gain cavity having a gain arm;
    a pulse shortening element disposed in the resonator arm and excluded from the gain arm;
    an optical switch for controllably selecting between the resonator arm and the gain arm;
    a mirror;
    a second mirror, the resonator cavity being disposed between the first mirror and the second mirror, and the resonator arm being disposed between the optical switch and the second mirror;

a third mirror, the gain cavity being disposed between the first mirror and the third mirror, and the gain arm being disposed between the optical switch and the third mirror;

wherein the resonator cavity and the gain cavity share a common segment disposed between the first mirror and the optical switch.

21. The pulsed laser of claim 20 further comprising a variable switch disposed in the common segment for outputting a light pulse.

22. The pulsed laser of claim 20 further comprising a variable switch disposed in the gain arm for outputting a light pulse.

23. The pulsed laser of claim 20 wherein one of the first mirror, the second mirror, and the third mirror is partly transmissive for outputting a light pulse.

24. An active-passive mode locked laser comprising:
a first high reflectivity mirror;
a second high reflectivity mirror, a first beam path being defined between the first high reflectivity mirror and the second high reflectivity mirror;
a loss module disposed in the first beam path;
an active mode locker disposed in the first beam path;
a passive mode locker disposed in the first beam path;
a third high reflectivity mirror, a second beam path being defined between the first high reflectivity mirror and the third high reflectivity mirror and having a common beam path segment in common with the first beam path;
a cavity dumper disposed in the common beam path segment and having an output beam path;
a gain module disposed in the common beam path segment; and
a switch disposed in the common beam path segment at a first end thereof, a second end of the common beam path segment being at the first mirror.

25. The laser of claim 24 further comprising:
a subsequent polarizer disposed in the second beam path.

26. A method for producing a high power pulsed laser beam comprising:

establishing at least one light pulse in a first beam path;
shortening the light pulse in the first beam path to obtain at least one short light pulse, the first beam path comprising a passive pulse shortening element;
directing the short light pulse into a second beam path, the passive pulse shortening element being absent from the second beam path; and
amplifying the short light pulse in the second beam path to obtain at least one high power short light pulse;
wherein the first beam path and the second beam path have at least one segment in common; and
wherein the first beam path and the second beam path have respective separate segments, the passive pulse shortening element being disposed in the separate segment of the first beam path.

27. The method of claim 26 further comprising:
directing the high power short light pulse from the second beam path to form the high power pulsed laser beam.

28. A method of operating a laser to produce a pulsed laser beam, comprising:
establishing light in a resonator cavity of the laser to produce a first light pulse, the resonator cavity comprising a saturable absorber having a saturation level, and the first light pulse having a duration and further having a peak power below the saturation level of the saturable absorber;
amplifying light in the resonator cavity to produce a second light pulse having a peak power above the saturation level of the saturable absorber and a duration less than the duration of the first light pulse;
directing the second light pulse from the resonator cavity into a gain cavity, the gain cavity excluding the saturable absorber;
amplifying the second light pulse in the gain cavity to obtain a third light pulse having a peak power above the peak power of the second light pulse; and
outputting the third light pulse from the laser.

* * * * *